United States Patent [19]

Parish

[11] Patent Number: 5,302,652
[45] Date of Patent: Apr. 12, 1994

[54] PROCESS FOR PREPARING A PIGMENTED POLYIMIDE SHAPED ARTICLE

[75] Inventor: Darrell J. Parish, Circleville, Ohio

[73] Assignee: E. I. Du Pont de Nemours and Company, Wilmington, Del.

[21] Appl. No.: 991,524

[22] Filed: Dec. 15, 1992

[51] Int. Cl.$^5$ .......................... C08K 3/04; C08K 9/04; C08L 79/08; C04B 35/00
[52] U.S. Cl. .................... 524/424; 524/437; 252/511; 252/512
[58] Field of Search ............... 524/437, 424; 252/511, 252/512

[56] References Cited

U.S. PATENT DOCUMENTS

| | | | |
|---|---|---|---|
| 4,986,946 | 1/1991 | Parish | 264/104 |
| 5,075,036 | 12/1991 | Parish | 252/511 |
| 5,078,936 | 1/1992 | Parish et al. | |

FOREIGN PATENT DOCUMENTS 708896 4/1963 Canada .

*Primary Examiner*—James J. Seidleck
*Assistant Examiner*—I. Zemel

[57] ABSTRACT

A process for preparing a pigmented polyimide article having a polyimide matrix with finely divided pigment particles uniformly dispersed therein. The process includes the steps of milling pigment particles in an organic solvent, pre-wetting the pigment particles with a thermoplastic polyamic acid precursor derived from 4,4'-oxydiphthalic dianhydride and an aromatic and/or aliphatic diamine, admixing the treated pigment particles with a polyamic acid polymerization mixture to form a dope, shaping the dope and thermally or chemically converting the shaped dope into a polyimide article containing the pigment particles uniformly dispersed therein.

13 Claims, No Drawings

PROCESS FOR PREPARING A PIGMENTED POLYIMIDE SHAPED ARTICLE

BACKGROUND OF THE INVENTION

This invention relates to a process for preparing a polyimide shaped article, e.g. a sheet or film, containing pigment particles, such as carbon or alumina, and having improved tensile and dielectric strength, elongation and electrical conductivity.

Pigment containing polyimide articles, such as polyimide film, are well-know in the art and are generally prepared by blending pigment particles into the polyamic acid precursor and then shaping and curing the polyamic acid to form the polyimide.

For example, Canadian Patent 708,896 discloses an electrically conductive polyimide composition prepared by blending conductive carbon particles, e.g. carbon blacks, in the precursor polyamic acid; shaping the particle containing polyamic acid into a structure; and then thermally converting the shaped structure into a polyimide containing the carbon particles.

U.S. Pat. No. 5,078,936, issued to Parish et al on Jan. 7, 1992, discloses an electrically conductive polyimide article prepared by blending carbon black and graphite in a polar solvent to form a slurry, mixing the slurry with a polyamic acid precursor to form a dope, shaping the dope into a structure and then converting the shaped structure into the polyimide article.

Normally, the blending of the pigment particles is performed while the polyamic acid is in solution in an organic solvent, such as N,N-dimethylacetamide. In order to facilitate particle dispersion and maximize wetting of the pigment particles with the polyamic acid polymer, the pigment particles are slurried in the polymer solvent in a ball, sand or Kady mill. Typically, the pigment particles have a higher density than the solvent and tend to settle and reagglomerate. In addition, the level of adhesion between the polyamic acid polymer and the pigment particles is oftentimes very low and results in lowering of the properties of the polyimide film, e.g. decreased dielectric strength, tenacity and elongation.

It has now been found that shaped polyimide articles containing pigment particles can be prepared by first pre-wetting the pigment particles in an organic solvent with a thermoplastic polyamic acid precursor derived from 4,4'-oxydiphthalic dianhydride and an aliphatic and/or aromatic diamine; admixing the precursor treated pigment particles with a polymerization mixture of an aromatic tetracarboxylic acid dianhydride and an aromatic diamine in the organic solvent and thermally or chemically converting the polyamic acid containing the pigment particles to the polyimide. Polyimide articles containing alumina prepared according to the process of the invention have improved tensile strength, elongation and dielectric strength, and polyimide articles containing carbon have improved electrical conductivity. Polyimide articles of this invention are suitable for use in electronics, copier belt, heating tape, opaque film and thermally conductive film applications.

SUMMARY OF THE INVENTION

The present invention provides a shaped polyimide article comprising an aromatic polyimide matrix derived from the reaction of an aromatic tetracarboxylic acid dianhydride and an aromatic diamine and containing from 10% to 50% by weight of finely divided pigment particles, prepared by the steps of: (a) dispersing said pigment particles in an organic polymerization solvent to provide a slurry; (b) treating said pigment slurry with a polyamic acid precursor derived from the reaction of substantially equimolar amounts of 4,4'-oxydiphthalic dianhydride and at least one diamine selected from the group consisting of a bis(aminophenoxy)benzene, a diaminodiphenyl ether, a phenylene diamine and a $C_{2-6}$ alkylene diamine to uniformly wet said pigment particles; (c) admixing said precursor treated pigment particles with a polymerization mixture comprising an aromatic tetracarboxylic acid dianhydride and an aromatic diamine in said organic polymerization solvent; (d) polymerizing said admixture to form a dope comprising a polyimide polymerization product dissolved in said organic polymerization solvent and containing the pigment particles uniformly dispersed therein; (e) shaping said dope into a predetermined structure; and (f) converting the shaped structure into a shaped polyimide article containing the pigment particles uniformly dispersed therein.

The shaped polyimide article can be prepared in the form of a sheet or film.

DETAILED DESCRIPTION OF THE INVENTION

The shaped polyimide article of the present invention is formed from a polymeric composition comprising an aromatic polyimide matrix and from 10% to 50% by weight of pigment particles. More particularly, 20% to 40% by weight of finely divided alumina particles or 14% to 32% by weight of carbon black particles have been found to be useful in the invention.

The polyimide matrix materials used in this invention include any polyimide obtained by chemical or, preferably, thermal conversion of a polyamic acid derived from the reaction of an aromatic tetracarboxylic acid dianhydride and an aromatic diamine, such as are disclosed in U.S. Pat. Nos. 3,179,630 and 3,179,634, the disclosures of which are incorporated herein by reference.

The polyamic acids are made by dissolving approximately equimolar amounts of an aromatic tetracarboxylic acid dianhydride and an aromatic diamine in an organic solvent and agitating the resulting solution under controlled temperature conditions until polymerization of the dianhydride and the diamine is completed.

Suitable aromatic tetracarboxylic acid dianhydrides for use in the polyimides include: pyromellitic dianhydride; 2,3,6,7-naphthalene tetracarboxylic dianhydride; 3,3',4,4'-biphenyl tetracarboxylic dianhydride; 1,2,5,6-naphthalene tetracarboxylic dianhydride; 2,2',3,3'-biphenyl tetracarboxylic dianhydride; 3,3',4,4'-benzophenone tetracarboxylic dianhydride; 2,2-bis(3,4-dicarboxyphenyl)propane dianhydride; bis(3,4-dicarboxyphenyl) sulfone dianhydride; 3,4,9,10-perylene tetracarboxylic dianhydride; bis(3,4-dicarboxy-phenyl)propane dianhydride; 1,1-bis(2,3-dicarboxy-phenyl)ethane dianhydride; 1,1-bis(3,4-dicarboxy-phenyl)ethane dianhydride; bis(2,3-dicarboxyphenyl)methane dianhydride; bis(3,4-dicarboxyphenyl)methane dianhydride; oxydiphthalic dianhydride; bis(3,4-dicarboxyphenyl) sulfone dianhydride; and the like.

Suitable diamines for use in the polyimides include: 4,4'-diaminodiphenyl propane; 4,4'-diaminodiphenyl methane; benzidine; 3,3'-dichlorobenzidine; 4,4'-diaminodiphenyl sulfide; 3,3'-diaminodiphenyl sulfone;

4,4'-diamino-diphenyl sulfone; 4,4'-diaminodiphenyl ether; 1,5-diamino naphthalene; 4,4'-diaminodiphenyl diethylsilane; 4,4'-diaminodiphenysilane; 4,4'-diaminodiphenyl ethyl phosphine oxide; 4,4'-diaminodiphenyl N-methyl amine; 4,4'-diamino-diphenyl-N-phenyl amine; 1,4-diaminobenzene (p-phenylene diamine); 1,3-diaminobenzene; 1,2-diamino-benzene; and the like.

The preferred polyimide used in this invention is derived from 4,4'-diaminodiphenyl ether and pyromellitic dianhydride.

Copolyimides derived from any of the above diamines and dianhydrides are also operable. Particularly preferred copolyimides are those derived from 15 to 85 mole % of biphenyltetracarboxylic dianhydride, 15 to 85 mole % pyromellitic dianhydride, 30 to 100 mole % p-phenylene-diamine and 0 to 70 mole % of 4,4'-diaminodiphenyl ether. Such copolyimides are described in U.S. Pat. No. 4,778,872 which disclosure is also incorporated herein by reference.

The organic solvent must dissolve one or both of the polymerizing reactants and, preferably, will dissolve the polyamic acid polymerization product. The solvent must, of course, be substantially unreactive with all of the polymerizing reactants and with the polyamic acid polymerization product.

Preferred organic solvents include normally liquid N,N-dialkylcarboxylamides, generally. Preferred solvents include the lower molecular weight members of such carboxylamides, particularly N,N-dimethylformamide and N,N-diethylacetamide. Other useful solvents are N,N-diethyl-formamide, N,N-diethylacetamide, diamethylsulfoxide, N-methyl-2-pyrrolidone, tetramethyl urea, dimethylsulfone, and the like. The solvents can be used alone or in combinations with one another. The amount of solvent used preferably ranges from 75 to 90 weight % of the polyamic acid, since this concentration has been found to give optimum molecular weight.

The polyamic acid solutions are generally made by dissolving the diamine in a dry solvent and slowly adding the dianhydride under conditions of agitation and controlled temperature in an inert atmosphere. The diamine is conveniently present as a 5 to 15 weight percent solution in the organic solvent and the diamine and dianhydride are used in about equimolar amounts.

The shaped polyimide article of the invention contains from 10% to 50% by weight of finely divided pigment particles.

Suitable pigment particles for use in the invention include electrically conductive materials such as carbon black, graphite, metal powders, etc. which are preferably used in amounts ranging from 14% to 32% by weight. Additionally, dielectric pigments such as alumina, mica, etc. can be added to the polyimide in amounts ranging from 20% to 40% by weight without unduly degrading the dielectric properties of the polyimide article.

The preferred electrical resistivity obtained using carbon particles or the thermal conductivity obtained using alumina particles in the polyimide article of the invention are as follows:

|  | CARBON FILLED | ALUMINA FILLED |
| --- | --- | --- |
| Electrical resistivity, ohm-cm | 0.7–2.0 | — |
| Thermal conductivity, w/mk | — | 0.35–0.55 |
| Dielectric strength, Kvolts/mil | — | 6–7 |
| Tensile strength, Kpsi | 16–23 | 18–25 |
| Elongation, % | 18–38 | 45–65 |

The shaped polyimide article of the invention is prepared by first dispersing the pigment particles in the organic polymerization solvent, preferably, N,N-dimethyl acetamide. Typically, a ball, sand or Kady mill is used while maintaining a milling temperature of from 45° to 58° C. The milling process provides a slurry containing the pigment particles uniformly dispersed in the organic polymerization solvent.

The pigment slurry is subsequently treated with from 2% to 5% by weight of a polyamic acid precursor derived from the reaction of substantially equimolar amounts of 4,4'-oxydiphthalic dianhydride and an aromatic and/or aliphatic diamine to uniformly wet the pigment particles slurried in the polymerization solvent. The use of the polyamic acid precursor derived from 4,4'-oxydiphthalic dianhydride retards pigment agglomeration and promotes adhesion between the pigment particles and the polyimide matrix, thereby improving such properties as tensile strength, elongation and dielectric strength when the pigment particles are alumina; and electrical conductivity when the pigment particles are carbon.

Suitable aromatic and aliphatic diamines for use in combination with 4,4'-oxydiphthalic dianhydride include: 1,3-bis(4-aminophenoxy)benzene; 1,3-bis(3-aminophenoxy)benzene; 1,4-bis(4-aminophenoxy)benzene; 1,4-bis(3-aminophenoxy)benzene; 4,4'-diaminodiphenyl ether; 3,4'-diaminodiphenyl ether; p-phenylene diamine; m-phenylene diamine; and hexamethylene diamine. These diamines can be used either individually to make a homopolymer or in combination to make a copolymer or terpolymer.

A particularly preferred polyamic acid precursor is derived from 4,4'-oxydiphthalic dianhydride and 1,3-bis(4-aminophenoxy)-benzene.

Copolymers of 4,4'-oxydiphthalic dianhydride, and from 5% to 50% by weight of additional dianhydrides such as pyromellitic dianhydride, 3,3',4,4'-biphenyltetracarboxylic acid dianhydride, 3,3',4,4'-benzophenonetetracarboxylic acid dianhydride, and the like, with an equimolar quantity of an aromatic diamine such as 1,3-bis(4-amino-phenoxy)benzene are also useful as the polyamic acid precursor. A particularly preferred polyamic acid copolymer precursor contains 0.95 mole of 4,4'-oxydiphthalic dianhydride, 0.05 mole pyromellitic dianhydride and 1.0 mole of 1,3-bis(4-aminophenoxy)benzene.

The precursor treated pigment particles are next admixed with a polymerization mixture of an aromatic tetracarboxylic acid dianhydride and an aromatic diamine in an additional amount of organic polymerization solvent, preferably at a temperature of 100° C. or less, more preferably at a temperature of 0° to 60° C. to provide a dope, wherein the pigment particles are uniformly dispersed in the polyamic acid polymerization product solution.

Optionally, an additional amount of the polymerization solvent may be added to the admixture to adjust the rotation viscosity; a release agent may be added or the admixture may be defoamed. The resultant dope consists of a solution of the polyamic acid polymerization product with the pigment particles uniformly dispersed in the solution.

The dope is subjected to shaped article producing procedures. For example, the dope is converted to a thin layer by a conventional film-forming process. The dope is spread on a flat surface of a substrate, for example, a glass plate or metal plate, a curved surface of a substrate, for example, a peripheral surface of a metal drum, or a flat or curved surface of an endless metal belt, to form a thin film layer of the dope having an even thickness. The dope can also be molded in a mold having a desired shape.

The shaped dope is gradually dried, preferably at a temperature of about 50° to 200° C., more preferably 60° to 180° C., by evaporating the organic solvent polymerization solvent. The resultant shaped solid article contains a small amount of the polymerization solvent. The shaped article is heated at a temperature of from about 200° to 500° C., preferably from 250° to 450° C., to completely dry and thermally convert the polyamic acid in the shaped article to the corresponding polyimide polymer.

The shaped polyamic acid article can also be converted to the shaped polyimide article by a chemical conversion process. Chemical conversion is accomplished by treating the polyamic acid with a chemical dehydrating agent alone or in combination with a tertiary amine. The dehydrating agent is necessary for the chemical conversion but the tertiary amine can be used or not, as desired or required for a particular case. The tertiary amine functions as a catalyst for the dehydrating-imidizing agent. Acetic anhydride is a preferred dehydrating agent and beta-picoline is a generally effective tertiary amine catalyst. The polyamic acid shaped article can be treated in a bath containing the dehydrating agent or it can be otherwise exposed to the dehydrating agent to accomplish imidization.

High temperatures are used to dry the shaped polyamic acid article and convert it to the polyimide. Usually, temperatures of from 200° to 450° C. for from 15 to 400 seconds are used to chemically convert the shaped polyamic acid article to the shaped polyimide article.

A typical film casting dope contains 8.5% of pigment particles treated with 0.9% of polyamic acid precursor, 12.5% of polyamic acid polymerization product, 0.6% of release agent and 77.5% or organic solvent, and has a rotation viscosity of about 500 to 3000 poises, most preferably from 1500 to 2500 poises. The dope can be easily shaped, for example, into a thin film layer.

A suitable polyimide shaped article in the form of a film or sheet preferably has a thickness of from 10 to 150 micrometers, more preferably 25 to 100 micrometers.

The examples presented hereinbelow serve to more fully elaborate the ways in which the present invention can be practically used. However, it should be understood that the examples are only illustrative and in no way limit the scope of the present invention. All parts and percentages are by weight unless otherwise specified.

| GLOSSARY | |
|---|---|
| DMAC = | N,N-dimethylacetamide |
| ODPA = | 4,4'-oxydiphthalic dianhydride |
| 134APB = | 1,3-bis(4-aminophenoxy)benzene |
| PMDA = | pyromellitic dianhydride |

| -continued | |
|---|---|
| GLOSSARY | |
| DADE = | 4,4'-diaminodiphenylether |
| TPPI = | triphenylphosphite |
| HMD = | hexamethylene diamine |
| BPDA = | 3,3',4,4'-biphenyltetracarboxylic dianhydride |
| 3,4'-DADE = | 3,4-diaminodiphenyl ether |
| MPD = | m-phenylene diamine |

EXAMPLES 1 TO 3 (COMPARATIVE EXAMPLES 1A TO 3A AND 1B TO 3B)

A slurry of carbon particles in DMAC was prepared by adding 35 g of "Printex EX-2" carbon particles (Degussa Corp.) and 15 g of HPN-5 graphite (Dixon Chemical Co.) to 1000 g of DMAC. The slurry was milled in a Kady mill for 30 minutes to reduce carbon agglomerates to a size conducive to the generation of smooth films, typically 0.3–0.6 micrometers.

The slurry was treated with 100 g of an 11% solids polyamic acid precursor polymer derived from the reaction of equimolar amounts of ODPA (Occidental Chemical Co.) and 134APB (Du Pont) and milled for an additional 8 minutes to effect uniform wetting of the carbon particles with the ODPA-134APB polyamic acid precursor polymer. The inherent viscosity of the ODPA-134APB polymer was 1.43 dl/g, as measured in DMAC using an Ostwald viscometer.

Three casting dopes were prepared from 75 g, 100 g and 125 g of the slurry by admixing with 100 g of a 20.3% solids solution of a polyamic acid derived from PMDA and DADE (Examples 1, 2 and 3).

Three similar casting dopes were prepared as described above using, in place of the ODPA-134APB polyamic acid polymer, an 11% solids PMDA-DADE polyamic acid polymer having an inherent viscosity of 1.45 dl/g (Comparative Examples 1A, 2A and 3A).

Finally, three casting dopes were prepared as described above using, in place of the ODPA-134APB polyamic acid polymer, an 11% solids PMDA-DADE polyamic acid polymer having an inherent viscosity of 1.02 dl/g (Comparative Examples 1B, 2B and 3B).

The nine casting dopes were aged at room temperature for 18 hours to effect deaeration. Using a doctor rod gapped to deliver the desired film thickness, the dopes were cast onto Pyrex ® glass plates and heated at 108° to 112° C. for about 30 minutes to increase the solids content to about 75%. The resulting "green", or uncured, films were peeled from the glass plates, clamped onto frames and cured in an air circulating oven for 30 minutes at a temperature of 150° to 340° C. to form the final cured polyimide films.

The resultant films were tested for electrical resistivity using a 4-point Veeco probe instrument. Film thicknesses were measured using an Ames gauge, Model 122DB.

Surface resistivities were converted into volume resistivities using the following equation:

$$\text{Volume Resistivity (Ohm-cm)} = \frac{\text{Film thickness (mils)} \times \text{surface Resistivity (Ohms/Square)}}{393.8 \text{ (English-metric Conversion Factor)}}$$

Tensile properties of the films were measured according to ASTM D-882-64T.

The results are summarized in Table I and show that the ODPA-134APB stabilized polyimide films (Examples 1 to 3) have lower electrical resistance, i.e., are much more conductive, than the corresponding PMDA-DADE stabilized films (Comparative Examples 1A to 3A and 1B to 3B).

TABLE I

ELECTRICAL AND TENSILE PROPERTIES OF PMDA-DADE POLYIMIDE FILM CONTAINING CARBON/GRAPHITE PARTICLES

| EXAMPLE NO. | % CARBON/ GRAPHITE RESIST. IN FILM | SLURRY ADDITIVE | % ADDITIVE IN FILM* | FILM THICKNESS (MILS) |
|---|---|---|---|---|
| 1 | 14.5 | ODPA-134APB | 2.9 | 1.15 |
| 2 | 18.3 | ODPA-134APB | 4.3 | 1.18 |
| 3 | 21.7 | ODPA-134APB | 5.3 | 1.15 |
| 1A | 14.5 | PMDA-DADE | 2.9 | 1.20 |
| 2A | 18.3 | PMDA-DADE | 4.3 | 1.05 |
| 3A | 21.7 | PMDA-DADE | 5.3 | 1.00 |
| 1B | 14.5 | PMDA-DADE | 2.9 | 1.20 |
| 2B | 18.3 | PMDA-DADE | 4.3 | 1.20 |
| 3B | 21.7 | PMDA-DADE | 5.3 | 0.95 |

| EXAMPLE NO. | SURFACE RESIST. (OHMS/ SQUARE) | VOLUME (OHM-CM) | TENSILE STRENGTH (KPSI) | MODULUS (KPSI) | ELONGATION (%) |
|---|---|---|---|---|---|
| 1 | 560 | 1.6345 | 12.9 | 460 | 8.3 |
| 2 | 283 | 0.8475 | 10.3 | 395 | 6.8 |
| 3 | 181 | 0.5283 | 9.2 | 366 | 8.2 |
| 1A | 682 | 2.0771 | 10.6 | 381 | 6.5 |
| 2A | 336 | 0.8954 | 7.6 | 311 | 4.7 |
| 3A | 223 | 0.5660 | 7.7 | 266 | 6.0 |
| 1B | 800 | 2.4365 | 10.6 | 387 | 6.5 |
| 2B | 383 | 1.1665 | 8.8 | 327 | 6.3 |
| 3B | 294 | 0.7089 | 6.8 | 277 | 5.9 |

EXAMPLES 4 TO 6 (COMPARATIVE EXAMPLES 4A TO 6A AND 4B TO 6B)

Three pigment slurries were prepared by milling 200 g of alumina particles (Type A15SG from Alcoa) in 200 g of DMAC for 30 minutes in a Kady mill.

Three polyamic acid solutions containing 11% solids in DMAC were prepared as follows:

1. ODPA(62 g) was added to a stirred solution of 58.4 g of 134APB in 974 g DMAC in small portions over a 2 hour period. The resultant ODPA-134APB polyamic acid solution polymer had a solution viscosity of 10 poises.
2. DMAC(356 g) was added to 400 g of a 20.8% PMDA-DADE polyamic acid polymer solution containing 0.95 mole of PMDA per mole of DADE. The resultant PMDA-DADE polyamic acid solution had a solution viscosity of 10 poises.
3. DMAC(338 g) was added to 400 g of a PMDA-DADE polyamic acid polymer solution containing approximately equimolar amounts of PMDA and DADE. The resultant PMDA-DADE polyamic acid solution had a viscosity of 55 poises.

The three polyamic acid solutions (200 g) were added to the three alumina slurries and milling was continued for 8 more minutes to assure uniform blending.

Nine casting dopes were prepared by admixing 100 g of a 20.3% solids solution of a polyamic acid derived from PMDA and DADE with 45 g, 55 g and 35 g portions of each of the three alumina slurries. An additional 2 g of a 6% solution of PMDA (0.12 g 100% basis) in DMAC was added to each dope to increase the molecular weight of the polymer. In addition, 5 g of a 20% solution of TPPI in DMAC were added to each dope to both facilitate release of the green film from the casting surface and sequester ionic species in the polymer.

The nine casting dopes were deaerated for 18 hours at room temperature to minimize blister and bubble formation in the final films.

Films were prepared from the nine casting dopes by doctoring each onto a Pyrex ® glass plate and heating at 108° to 112° C. for 30 minutes. The resultant green films, containing approximately 70% polymer solids, were peeled from the glass, clamped onto drying frames and cured in an air-circulating oven at 250° to 350° C. for about 30 minutes.

The films were evaluated for dielectric strength using ASTM-D-149-64 and for tensile properties using ASTM-D-882-64T. Film thicknesses were measured using an Ames gauge, Model 122DB. The results are summarized in Table II.

TABLE II

DIELECTRIC AND TENSILE PROPERTIES OF PMDA-DADE POLYIMIDE FILM CONTAINING ALUMINA PARTICLES

| EXAMPLE NO. | SLURRY ADDITIVE | | |
|---|---|---|---|
| | TYPE | % ADDITIVE IN FILM | % Al₂O₃ IN FILM |
| 4 | ODPA/134APB | 3.6 | 42.6 |
| 5 | ODPA/134APB | 4.1 | 47.3 |
| 6 | ODPA/134APB | 3.1 | 37.1 |
| 4A | PMDA/DADE | 3.6 | 42.6 |
| 5A | PMDA/DADE | 4.1 | 47.3 |
| 6A | PMDA/DADE | 3.1 | 37.1 |
| 4B | PMDA/DADE | 3.6 | 42.6 |
| 5B | PMDA/DADE | 4.1 | 47.3 |
| 6B | PMDA/DADE | 3.1 | 37.1 |

| FILM PROPERTIES | | | |
|---|---|---|---|
| THICKNESS (MILS) | DIELECTRIC STRENGTH (V/MIL) | TENSILE STRENGTH (KPSI) | ELONGATION (%) |
| 1.70 | 4412 | 13.0 | 24.8 |
| 1.65 | 4424 | 14.8 | 41.7 |
| 2.09 | 3971 | 13.4 | 26.5 |
| 1.67 | 3593 | 11.3 | 18.0 |
| 1.59 | 3935 | 12.3 | 16.1 |
| 2.62 | 3534 | 13.2 | 19.5 |
| 1.02 | 4118 | 11.8 | 19.1 |
| 0.87 | 4598 | 12.4 | 14.3 |
| 1.06 | 4906 | 13.0 | 21.3 |

EXAMPLES 7 AND 8 (COMPARATIVE EXAMPLES 7A AND 8A)

A slurry of 35 g of Printex ® EX-2 carbon and 15 g of HPN-5 graphite in 1000 g of DMAC was milled for 30 minutes and then 98 g of an 11% solids ODPA-134AMP polyamic acid polymer in DMAC were added and milling continued for an additional 8 minutes.

A second slurry was prepared as described above, except that 98 g of an 11% solids PMDA-DADE polyamic acid polymer was used in place of the ODPA-134APB polymer.

Casting dopes were prepared by admixing 75 g of each carbon/graphite slurry with 100 g of a 20.3% solids PMDA-DADE polyamic acid polymer having a viscosity of 2500 poises. The dopes were deaerated for 18 hours at 25° C.

Films were prepared from the casting dopes using the thermal conversion process described in Examples 1 to 3.

Films were also prepared from the casting dopes using a chemical conversion process wherein the dopes were doctored onto glass plates as described in Examples 1 to 3, which were then immersed in a 1:1 by volume mixture of acetic anhydride and beta-picoline. After 4 to 6 minutes immersion, self-supporting gel films formed which were readily removed from the glass plates. The gel films were clamped onto a frame and cured as described in Examples 1 to 3.

Table III summarizes the film properties obtained using both thermal and chemical conversion processes.

TABLE III

ELECTRICAL AND TENSILE PROPERTIES OF PMDA-DADE POLYIMIDE FILM CONTAINING CARBON/GRAPHITE PARTICLES PREPARED BY CHEMICAL AND THERMAL CONVERSION

| EXAMPLE NO. | 7 | 8 | 7A | 8A |
|---|---|---|---|---|
| Wt. % Carbon/graphite in Polyimide film | 14.4 | 14.4 | 14.4 | 14.4 |
| Slurry Additive | ODPA-134APB | ODPA-134APB | PMDA-DADE | PMDA-DADE |
| (wt. % in polyimide film) | (2.8) | (2.8) | (2.8) | (2.8) |
| Imidization Method | Thermal | Chemical | Thermal | Chemical |
| Density (g/cc) | 1.4522 | 1.3488 | 1.4482 | <1.3106 |
| Thickness (mil) | 1.0 | 1.0 | 1.2 | 1.3 |
| Surface Resistance (Ohms/Sq) | 660 | 69,400 | 649 | $>10^{12}$ |
| Volume Resistance (Ohm·Cm) | 1.68 | 176.2 | 1.98 | $>3 \times 10^8$ |
| Tensile Strength (Kpsi) | 10.4 | 9.7 | 7.9 | 8.1 |
| Elongation (%) | 7.8 | 7.4 | 7.0 | 7.1 |
| Modulus (Kpsi) | 379 | 356 | 344 | 353 |

EXAMPLES 9 TO 12

A series of 11% solids polyamic acid copolymers in DMAC were prepared by dissolving the specified molar amounts of dianhydrides and diamines described in Table IV. In the case of copolymers derived from two diamines, the diamines were dissolved in DMAC prior to dianhydride addition. In copolymers containing two dianhydrides, the dianhydrides were alternatively added to a stirred solution of diamine in DMAC.

A slurry of 35 g of Printex ® XE-2 carbon black and 15 g of HPN-5 graphite in 1000 g of DMAC was milled for 30 minutes. After milling, 98 g of the polyamic acid copolymer additive (see Table IV) was blended into the slurry.

Seventy-five grams of the slurry was subsequently admixed with 100 g of PMDA-DADE polyamic acid polymer.

Films were prepared using the thermal conversion process described in Examples 1 to 3 and evaluated for electrical resistance, thickness and glass transition temperature. The results are summarized in Table IV.

What is claimed is:

1. A shaped polyimide article comprising an aromatic polyimide matrix derived from the reaction of an aromatic tetrcarboxylic acid dianhydride and an aromatic diamine and containing from 10% to 50% by weight of finely divided pigment particles, prepared by the steps of:
   (a) dispersing said pigment particles in an organic polymerization solvent to provide a slurry;
   (b) treating said pigment slurry with a polyamic acid precursor derived from the reaction of substantially equimolar amounts of 4,4'-oxydiphthalic dianhydride and at least one diamine selected from the group consisting of a bis(aminophenoxy)benzene, a diaminodiphenyl ether, a phenylenediamine and a $C_{2-6}$ alkylene diamine to uniformly wet said pigment particles;
   (c) admixing said precursor treated pigment particles with a polymerization mixture comprising an aromatic tetracarboxylic acid dianhydride and an aromatic diamine in said organic polymerization solvent;
   (d) polymerizing said admixture to form a dope comprising a polyimide polymerization product dissolved in said organic polymerization solvent and containing the pigment particles uniformly dispersed therein;
   (e) shaping said dope into a predetermined structure; and
   (f) converting the shaped structure into a shaped polyimide article containing the pigment particles uniformly dispersed therein.

2. The shaped polyimide article of claim 1 wherein the finely divided pigment particles comprise from 14% to 32% by weight of finely divided carbon particles.

TABLE IV

| EX. NO. | ADDITIVE COMPOSITION DIANHYDRIDE(S) | DIAMINE(S) | POLYMER Tg (°C.) | FILM THICKNESS (MIL) | WEIGHT % CARBON | WEIGHT % ADDITIVE | VOLUME RESISTANCE (Ohm-Cm) |
|---|---|---|---|---|---|---|---|
| — | PMDA | DADE | >400 | 1.11 | 14.4 | 2.8 | 1.92 |
| — | BPDA | MPD | 299 | 0.98 | 14.4 | 2.8 | 1.85 |
| 9 | ODPA | 134APB/HMD (50/50) | 180 | 0.94 | 14.4 | 2.8 | 1.61 |
| 10 | ODPA/PMDA (95/5) | 134APB | 217 | 1.00 | 14.4 | 2.8 | 1.66 |
| 11 | ODPA | 3,4'DADE/ 134APB (50/50) | 225 | 1.01 | 14.4 | 2.8 | 1.69 |
| 12 | ODPA/BPDA (50/50) | MPD/DADE (50/50) | 282 | 0.95 | 14.4 | 2.8 | 1.72 |

3. The shaped polyimide article of claim 1 wherein the finely divided pigment particles comprise from 20% to 40% by weight of finely divided alumina particles.

4. The shaped polyimide article of claim 1 wherein the aromatic polyimide matrix is derived from the reaction of pyromellitic dianhydride and 4,4'-diaminodiphenyl ether.

5. The shaped polyimide article of claim 4 wherein the polyamic acid precursor in step (b) is derived from the reaction of 4,4'-oxydiphthalic dianhydride and 1,3-bis(4-aminophenoxy)benzene.

6. The shaped polyimide article of claim 4 wherein the polyamic acid precursor in step (b) is derived from the reaction of 4,4'-oxydiphthalic dianhydride, pyromellitic dianhydride and 1,3-bis(4-aminophenoxy)benzene.

7. The shaped polyimide article of claim 4 wherein the polyamic acid precursor in step (b) is derived from the reaction of 4,4'-oxydiphthalic dianhydride, 1,3-bis(4-aminophenoxy)benzene and hexamethylene diamine.

8. The shaped polyimide article of claim 4 wherein the polyamic acid precursor in step (b) is derived from the reaction of 4,4'-oxydiphthalic dianhydride, 1,3-bis(4-aminophenoxy)benzene and 3,4'-diaminodiphenyl ether.

9. The shaped polyimide article of claim 4 wherein the polyamic acid precursor in step (b) is derived from the reaction of 4,4'-oxydiphthalic dianhydride, 3,3',4,4'-biphenyltetracarboxylic dianhydride, 4,4'-diaminodiphenyl ether and m-phenylene diamine.

10. The shaped polyimide article of claim 1 prepared by chemically converting the shaped structure in step (f).

11. The shaped polyimide article of claim 1 prepared by thermally converting the shaped structure in step (f).

12. The shaped polyimide article of claim 1 in the form of a film.

13. The shaped polyimide article of claim 1 wherein the pigment slurry in step (b) is treated with from 2% to 5% by weight of the polyamic acid precursor.

* * * * *